Figure 1:
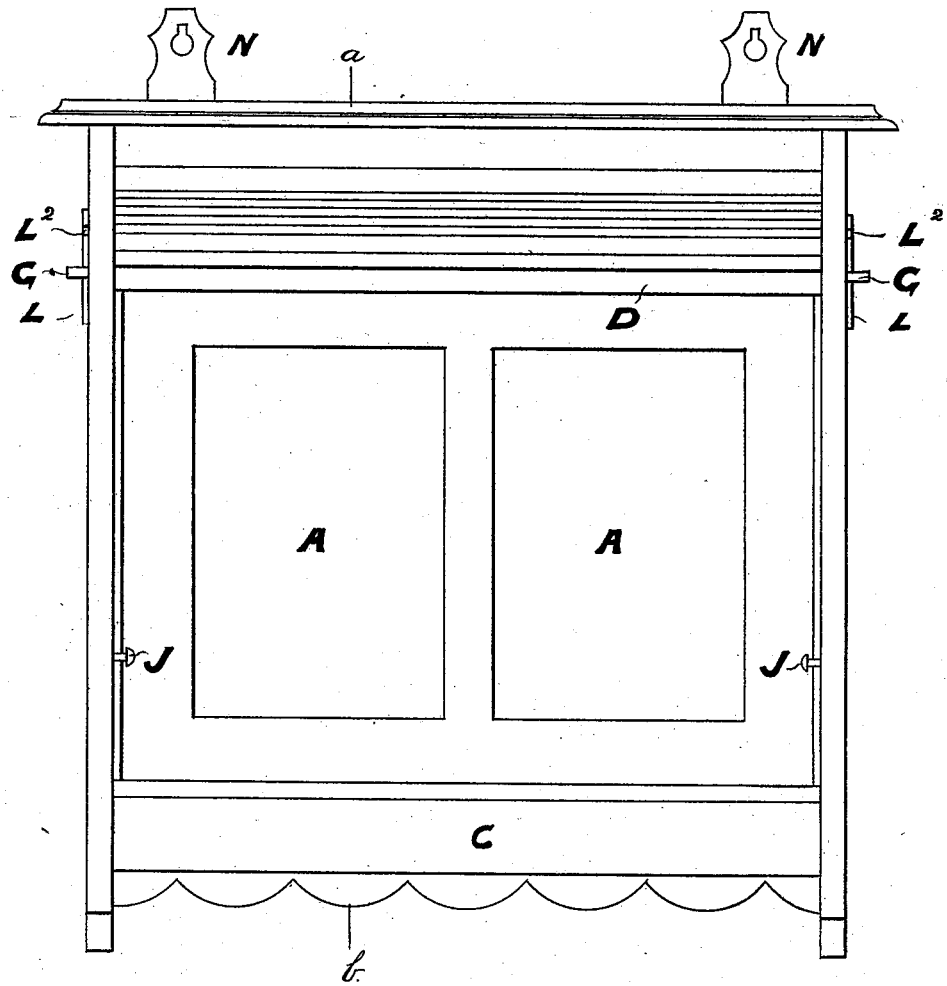

(No Model.) 2 Sheets—Sheet 1.

W. MIDDLEMISS.
FRAME FOR PHOTOGRAPHS, &c.

No. 549,606. Patented Nov. 12, 1895.

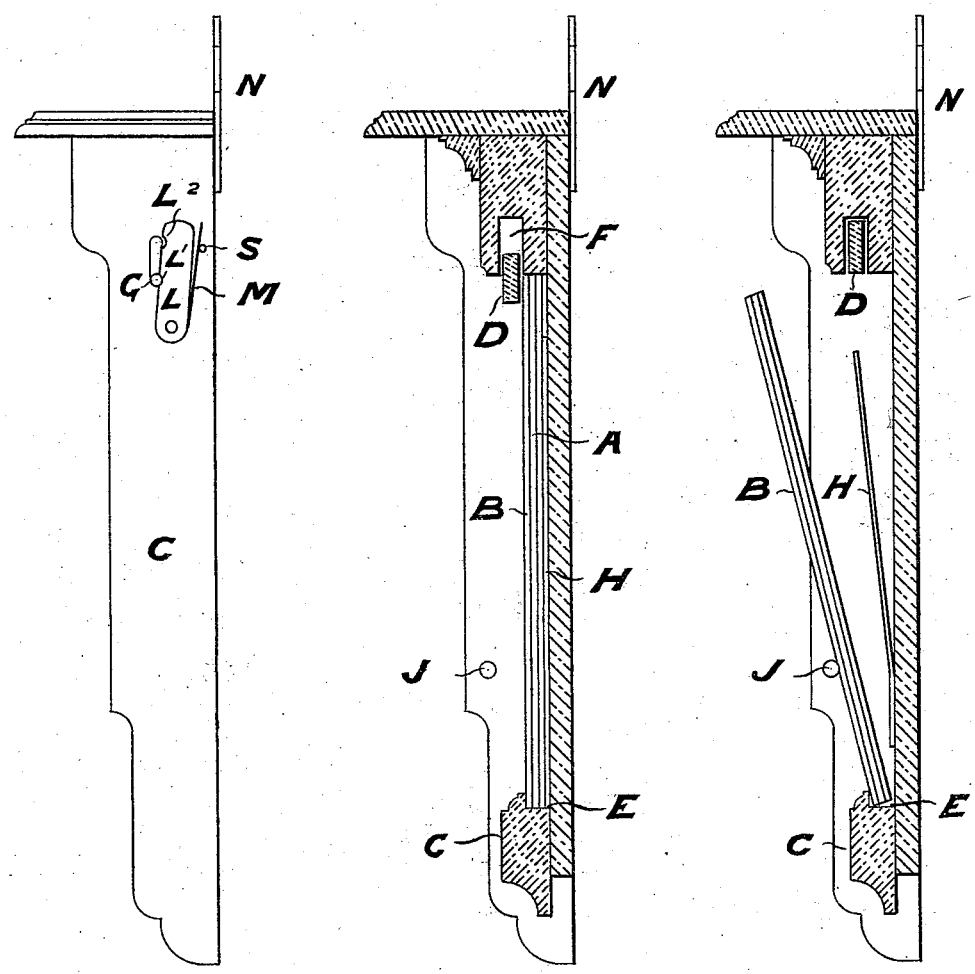

UNITED STATES PATENT OFFICE.

WILLIAM MIDDLEMISS, OF BRADFORD, ENGLAND.

FRAME FOR PHOTOGRAPHS, &c.

SPECIFICATION forming part of Letters Patent No. 549,606, dated November 12, 1895.

Application filed January 25, 1895. Serial No. 536,239. (No model.)

*To all whom it may concern:*

Be it known that I, WILLIAM MIDDLEMISS, a subject of the Queen of Great Britain and Ireland, residing at Bradford, in the county of York, England, have invented certain Improvements in Frames Suitable for Photographs and the Like, of which the following is a specification.

This invention relates to certain improvements in photographic and like frames, and has for its object the construction of same in such a manner that photographs and the like may be placed therein or removed with greater facility than is the case with frames of the ordinary description and at the same time to exclude dust from the interior of frame and prevent damage to the contents thereof.

In order that my invention may be fully understood, I will describe the same in detail by making reference to the accompanying sheets of drawings, in which—

Figure 1 represents a front view of my improved frame; Fig. 2, a side view of same; Fig. 3, a sectional view of same on line *a b* in Fig. 1, and Fig. 4 a similar view showing the glass front liberated in position for changing the photographic or other print.

The photographic print or the like A is placed, along with the glass B, into the frame C and secured therein at the top by a movable "slip" D and at the bottom by a "rabbet" E, formed in the framework C. The movable slip D slides in a recess F and is extended by studs G G, which pass through the frame at each side.

Upon raising the slip D by means of the studs G G the photographic print or the like A and glass B are liberated and moved forward by means of one or more springs H to the position somewhat as shown by Fig. 4, whereby the contents of the frame may be easily removed and others replaced at will.

The glass B and contents are prevented from being forced out of the frame by means of studs or the like J J, placed somewhat in the position shown. Such studs J J may be covered with india-rubber or other flexible material to prevent the liability of the glass becoming damaged.

In order that the movable slip D may be temporarily secured in either the "up" or "down" position, I mount at each end of the frame C a lever L, having notches $L'$ $L^2$ therein and provided with a suitable spring M, engaging with a fixed pin S, by which the lever is made to engage with the respective studs G.

The photographic frame C is shown as suitable for being suspended from a wall or the like by means of the lugs N N.

What I claim is—

1. In combination the frame having a rabbet E, and the recess F opposite the said rabbet the front B adapted thereto and the slip D arranged in the frame at a point opposite the rabbet and movable toward and from the same, said slip being in the form of a cross bar extending from side to side of the frame, substantially as described.

2. In combination, the frame having a rabbet, the front B, the removable slip arranged to slide in a recess in the frame and means for retaining the said slip in different positions, said slip being in the form of a cross bar extending from side to side of the frame with ends projecting through the same, substantially as described.

3. In combination, the frame having a rabbet E, the front B adapted thereto, the slip D arranged to slide in the frame and having studs G, G, projecting through the frame and the spring levers L engaging the studs, substantially as described.

In testimony whereof I have signed my name to this specification in the presence of two subscribing witnesses.

WM. MIDDLEMISS.

Witnesses:
 JNO. GILL,
 WM. PREST.